No. 763,511. PATENTED JUNE 28, 1904.
S. W. ROWELL.
CULTIVATOR.
APPLICATION FILED JAN. 29, 1903.
NO MODEL. 3 SHEETS—SHEET 3.
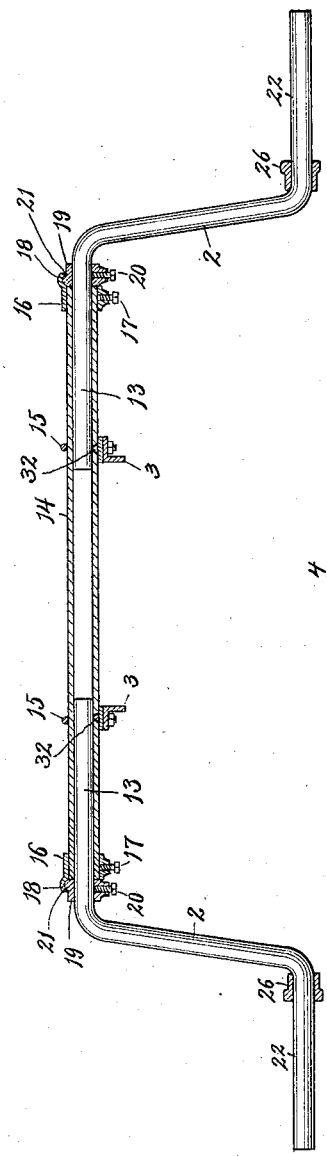
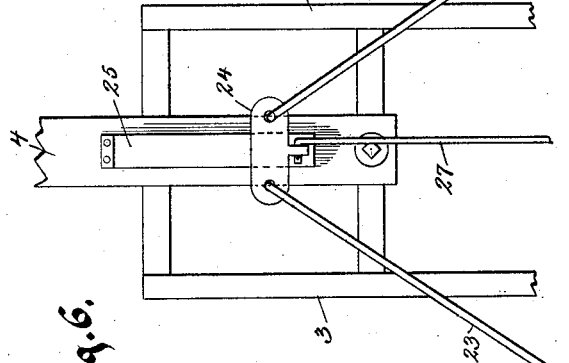
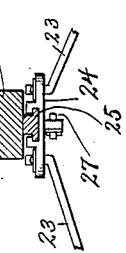
Witnesses.
Inventor.
Samuel W. Rowell No. 763,511. Patented June 28, 1904.

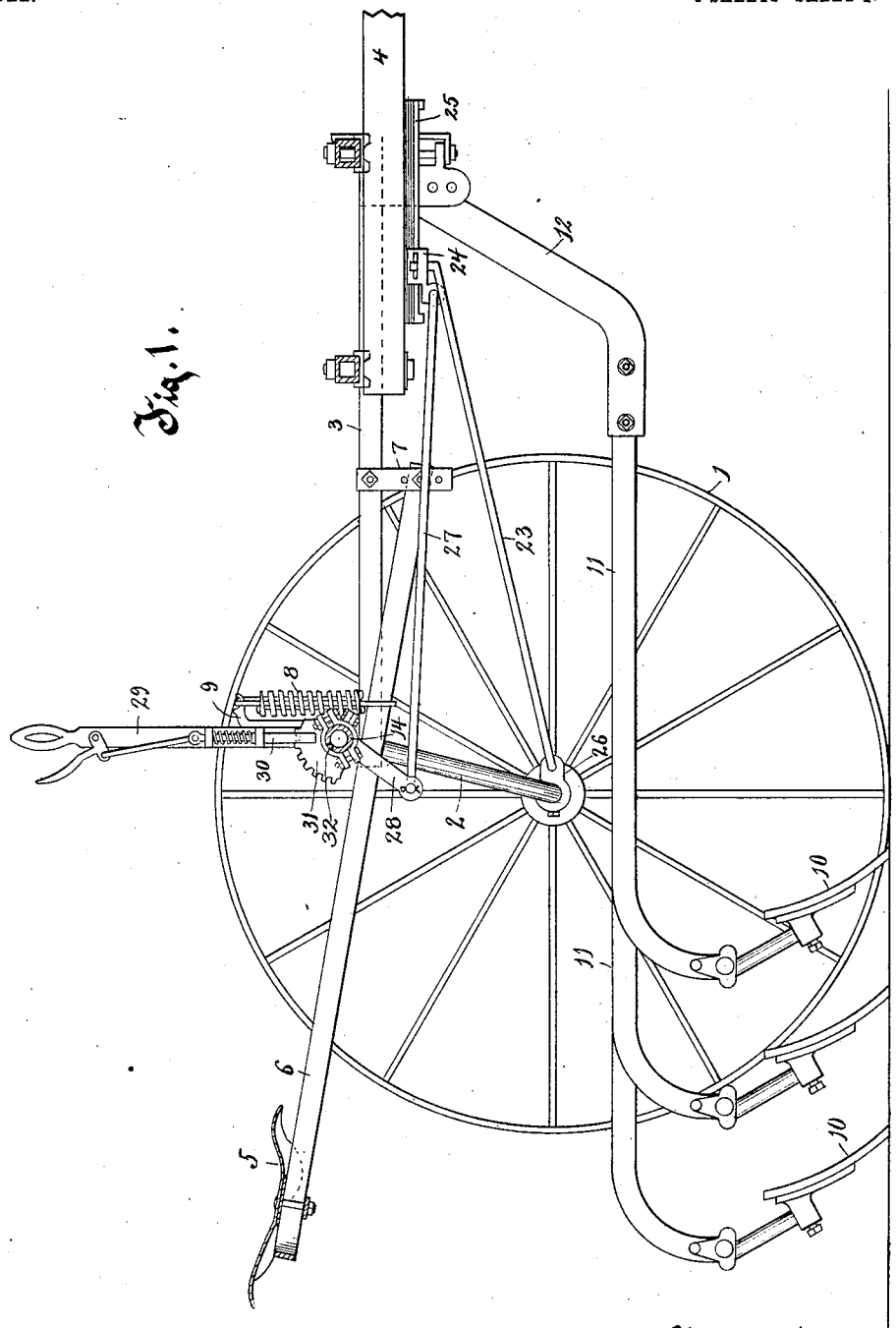

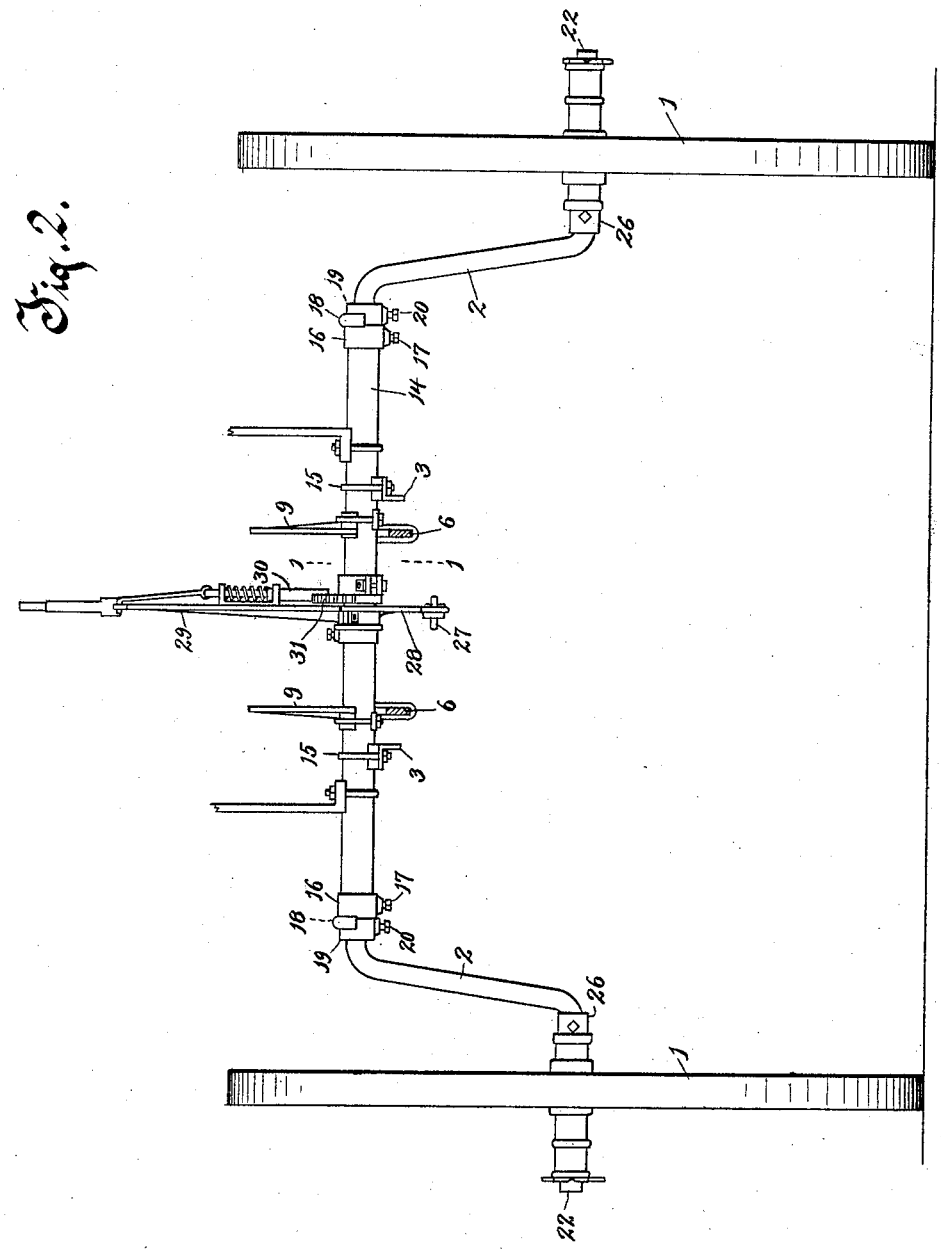

UNITED STATES PATENT OFFICE.

SAMUEL W. ROWELL, OF BEAVERDAM, WISCONSIN.

CULTIVATOR.

SPECIFICATION forming part of Letters Patent No. 763,511, dated June 28, 1904.

Application filed January 29, 1903. Serial No. 141,032. (No model.)

*To all whom it may concern:*

Be it known that I, SAMUEL W. ROWELL, residing at Beaverdam, in the county of Dodge and State of Wisconsin, have invented a new and useful Improvement in Cultivators, of which the following is a description, reference being had to the accompanying drawings, which are a part of this specification.

My invention is directed to improvements in the axle of a cultivator or analogous articles and in means in connection with the axle and the frame for shifting the position of the axle with reference to the frame. It is desirable that the weight of the frame and the load be, as nearly as possible, balanced at the front and rear upon the axle, and as a seat for the driver is provided on the frame at the rear of the axle the location of the axle as a fulcrum for the frame when the driver is in his seat is comparatively nearer the rear of the frame than it should be and than it is in properly-constructed cultivator-frames when the driver gets off from the frame and walks alongside of the cultivator when in use.

As above stated, my invention is directed chiefly to the improved construction of the axle and to the improved means for shifting the axle forward and back with reference to the frame.

My invention consists of the devices and their combinations, as herein described and claimed, or the equivalents thereof.

In the drawings, Figure 1 is a longitudinal section of a cultivator embodying my improvements, the section being on line 1 1 of Fig. 2 and a part of the tongue being broken off and omitted for convenience of illustration. Fig. 2 is a rear elevation of the axle and wheels of a cultivator, showing parts of my improvements therewith, other parts of the construction being omitted and some parts being shown in section. Fig. 3 is a detail of my improved axle, the intermediate tube and related parts, forming a part of the axle, being shown in section. Figs. 4 and 5 illustrate details of the devices by which the intermediate and terminal members of the axle are connected together adjustably and releasably. Fig. 6 is an under side view of a detail of the means for adjusting the position of the axle with reference to the frame. Fig. 7 is a transverse section of the tongue member of the device shown in Fig. 6 with related parts, exhibiting the construction shown in Fig. 6 from a point of view different from that shown in Fig. 6.

My invention relates to improvements in a cultivator mounted on wheels belonging to a class of agricultural implements in which a sulky construction is employed.

In the drawings, 1 1 are wheels mounted on the terminal portions 2 2 of an axle, on which the frame 3 is mounted, the frame being provided with a tongue 4 for attaching the team to the cultivator for hauling it along. A driver's seat 5 is mounted at the rear of the axle on an auxiliary frame 6, pivoted at its front end to straps 7 7, fixed on the frame in front of the axle, and this auxiliary frame is supported medially on extensible springs 8 8, depending from standards 9 9, fixed on the medial portion of the axle. The cultivator-blades 10 10 are mounted on beams 11 11, hinged at their front ends to a depending member of the frame 12.

The terminal members 2 2 of the axle are cranked and are advisably made of solid round metal (steel or iron) rods. The inner crank-wrist ends 13 13 of the axle are inserted in a tube 14, by means of which they are secured together and by means of which construction the crank-wrist ends 13 13 of the axle are secured in the medial tubular portion 14 adjustably, longitudinally, and revolubly, and also detachably. The medial tubular portion 14 of the axle is secured rigidly to members of the frame 3 3 by clips 15 15. On each end of the medial tubular member 14 an adjustable band or collar 16 is provided, secured to the tubular member adjustably conveniently by means of set-screws 17, and this collar is provided with a projecting overhanging portion 18, which is substantially semicircular in length about the axis of the tube and is provided in its inner surface with a groove circumferentially, by which construction the collar is adapted to serve as a way for the travel of a complementary member therein. A collar 19 is secured adjustably on each crank-wrist portion 13 of the terminal member 2 of the axle conveniently by means of a set-screw 20. This collar 19 is provided with a semicircular boss or rib 21, adapted to fit and travel revolubly in the guideway 18 of the collar 16. The construction is such that it not only permits of the movement revolubly of the member 2 in the tubular member 14, but also when the two members are in the positions relative to each other, (shown in Figs. 2 and 3,) the boss 21 being in the guideway 18, the members of the axle are held against separating from each other. By rotating the member 2 or 14 with reference to each other, so that the boss 21 is turned to the side of the tubular member 14 opposite the guideway 18, the member 2 may be removed from the member 14, being thus made readily detachable.

The terminal members 2 2 of the axle have their journal portions 22 22 connected by rods 23 23 to a block or cross-head 24, slidable on ways 25 therefor on the tongue. The rods 23 are conveniently connected to the journals 22 22 by hooking into hub-collars 26 26, fixed on the inner portions of the journals of the axle. For conveniently shifting the block 24 along on the ways 25, and thereby shifting the journals of the axle and the relative positions of the wheels forward or back with reference to the frame, the sliding block 24 is connected by a rod 27 to the lower arm 28 of a lever-handle 29, which is mounted pivotally on and about the medial axial member 14. This lever-handle 29 projects upwardly and is so located as to be readily taken hold of by the driver for shifting the journals of the axle. The lever-handle is provided with a spring-controlled latch 30, which takes into a segmental rack 31, fixed on the medial tubular member 14 of the axle. By throwing the lever-handle 29 rearwardly from the position shown in Fig. 1 the block 24 is moved forwardly on the ways 25, and the journals 22 of the axle are correspondingly shifted forwardly with reference to the frame, thus changing the fulcrum or support of the frame, so that with less weight on the part thereof at the rear of the journals the portion at the front will be correspondingly balanced. When the axle is in the position shown in Fig. 1, the driver, sitting on the seat 5 at the rear of the axle, will more nearly balance the weight of the frame in front of the journals of the axle.

For securely fastening the frame members and other parts to the tubular member 14, that are fixed thereon against rotation, I advisably employ a stud or short horn 32, projecting rigidly from the part or member that is fixed on the tube, which stud enters a hole therefor in the tube and prevents displacement or rotation of the parts with reference to each other. The stud may be cone-shaped, and the hole in the tube to receive it should be correspondingly formed and may be made by reaming or countersinking.

What I claim as my invention is—

In an agricultural implement, an axle comprising cranked terminal members, a medial tubular member into which the wrist portions of the cranked terminal members are insertible, guards on the ends of the medial member having segmental ways, and bosses on the terminal members fitting revolubly and securingly in the ways but capable of being detached by rotating the bosses away from the ways.

In testimony whereof I affix my signature in presence of two witnesses.

SAMUEL W. ROWELL.

Witnesses:
B. F. BARBER,
F. R. ROWELL.